US010643236B2

United States Patent
Ali et al.

(10) Patent No.: US 10,643,236 B2
(45) Date of Patent: May 5, 2020

(54) SYSTEMS AND METHODS FOR PREDICTING USER SEGMENTS IN REAL-TIME

(71) Applicant: WAL-MART STORES, INC., Bentonville, AR (US)

(72) Inventors: Afroza Ali, Belmont, CA (US); Kannan Achan, Saratoga, CA (US); Venkata Syam Prakash Rapaka, Cupertino, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 634 days.

(21) Appl. No.: 15/274,458

(22) Filed: Sep. 23, 2016

(65) Prior Publication Data

US 2018/0089737 A1    Mar. 29, 2018

(51) Int. Cl.
| | | |
|---|---|---|
| *G06Q 30/02* | (2012.01) | |
| *G06Q 30/06* | (2012.01) | |
| *H04L 29/08* | (2006.01) | |
| *G06N 7/00*  | (2006.01) | |

(52) U.S. Cl.
CPC ..... *G06Q 30/0255* (2013.01); *G06Q 30/0251* (2013.01); *G06Q 30/0253* (2013.01); *G06Q 30/0631* (2013.01); *H04L 67/22* (2013.01); *G06N 7/005* (2013.01); *G06Q 30/0256* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 9,060,031 | B1* | 6/2015 | Taylor | H04L 67/2814 |
| 9,519,919 | B2* | 12/2016 | Chandra | G06Q 30/0276 |
| 9,661,088 | B2* | 5/2017 | Krishnamoorthy | H04L 67/22 |
| 9,924,033 | B2* | 3/2018 | Sharpe | H04M 3/5141 |
| 2003/0063779 | A1* | 4/2003 | Wrigley | G06Q 30/02 |
| | | | | 382/116 |

(Continued)

OTHER PUBLICATIONS

Aljukhadar, M., et al., "Segmenting the Online Consumer Market," Marketing Intelligence & Planning, vol. 29, Iss. 4, pp. 421-435 (2011) (Year: 2011).*

(Continued)

*Primary Examiner* — Nicholas D Rosen
(74) *Attorney, Agent, or Firm* — Bryan Cave Leighton Paisner LLP

(57) ABSTRACT

Systems and methods can include one or more processing modules and one or more non-transitory storage modules storing computing instructions configured to run on the one or more processing modules and perform acts of storing a plurality of user segments for users of an ecommerce website, recording an online browsing trail of a user during an online browsing session on the ecommerce website, the online browsing trail comprising a sequence of one or more actions by the user of the ecommerce website during the online browsing session, and predicting, in real-time, a first user segment for the user from the plurality of user segments during the online browsing session based on the sequence of the one or more actions of the user in the online browsing trail during the online browsing session as recorded by the one or more non-transitory storage modules.

20 Claims, 5 Drawing Sheets

(56) References Cited

U.S. PATENT DOCUMENTS

| | | | |
|---|---|---|---|
| 2007/0208728 A1 | 9/2007 | Zhang et al. | |
| 2009/0187520 A1* | 7/2009 | Liu | G06O 30/02 706/21 |
| 2009/0259632 A1* | 10/2009 | Singh | G06F 16/951 |
| 2012/0221411 A1* | 8/2012 | Graham, Jr. | G06Q 30/02 705/14.52 |
| 2013/0198703 A1* | 8/2013 | Lu | G06F 17/5045 716/107 |
| 2013/0212125 A1* | 8/2013 | Wierenga | G06F 16/245 707/769 |
| 2014/0222503 A1* | 8/2014 | Vijayaraghavan | G06Q 30/0201 705/7.29 |
| 2014/0279793 A1* | 9/2014 | Wohlstadter | G06Q 30/0269 706/46 |
| 2015/0007065 A1* | 1/2015 | Krishnamoorthy | H04L 67/22 715/760 |
| 2015/0254349 A1* | 9/2015 | Sela | G09B 5/125 707/770 |
| 2015/0317709 A1* | 11/2015 | Zimmerman | G06Q 30/06 705/80 |
| 2016/0092921 A1* | 3/2016 | Chan | G06Q 30/0256 705/14.54 |
| 2016/0142541 A1* | 5/2016 | Sharpe | H04M 3/5141 379/92.01 |
| 2016/0267552 A1* | 9/2016 | Chandra | G06Q 30/0276 |
| 2017/0091805 A1* | 3/2017 | Tu | G06Q 30/0244 |

OTHER PUBLICATIONS

S. Roweis, L. Saul; "Nonlinear Dimensionality Reduction by Locally Linear Embedding"; www.sciencemag.org; Science vol. 290; Dec. 22, 2000; pp. 2323-2326.

T. Mikolov, I. Sutskever, K. Chen, G. Corrado, J. Dean; "Distributed Representations of Words and Phrases and their Compositionality"; pp. 1-9; NIPS; 2013.

* cited by examiner

SYSTEMS AND METHODS FOR PREDICTING USER SEGMENTS IN REAL-TIME

TECHNICAL FIELD

This disclosure relates generally to systems and methods for predicting user segments in real-time.

BACKGROUND

Conventional ecommerce websites are often ineffective in predicting products in which a user of the website may be interested. When a user browses an ecommerce website, factors such as shopping for other people or shopping for irregular events often inhibit the effectiveness of the ecommerce website in providing relevant product recommendations to the user.

BRIEF DESCRIPTION OF THE DRAWINGS

To facilitate further description of the embodiments, the following drawings are provided in which.

Figure 1:
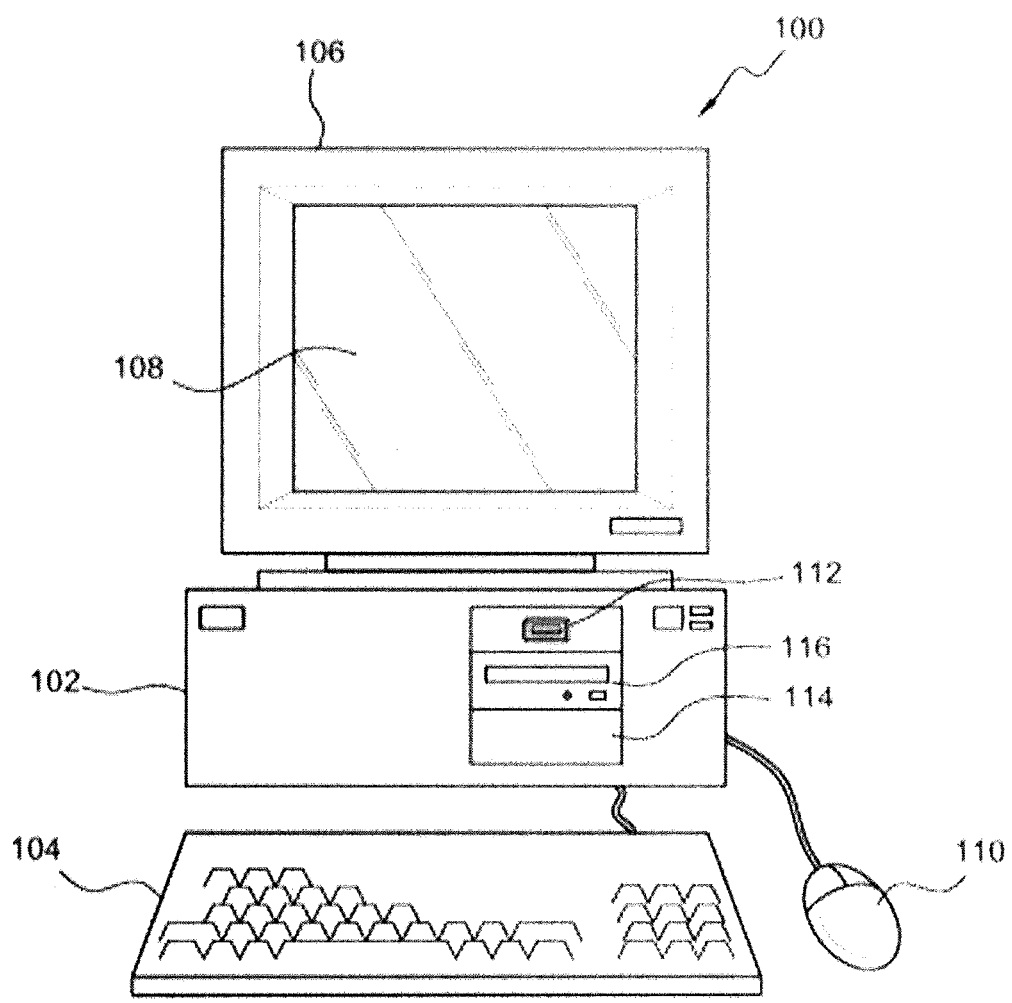
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The computing instructions can be configured to run on the one or more processing modules and perform acts of: storing a plurality of user segments for users of an ecommerce website; recording an online browsing trail of a user during an online browsing session on the ecommerce website, the online browsing trail comprising a sequence of one or more actions by the user of the ecommerce website during the online browsing session; and predicting, in real-time, a first user segment for the user from the plurality of user segments during the online browsing session based on the sequence of the one or more actions of the user in the online browsing trail during the online browsing session as recorded by the one or more non-transitory storage modules.

A number of embodiments can include a method. The method can include storing a plurality of user segments for users of an ecommerce website. The method can also include recording an online browsing trail of a user during a online browsing session on the ecommerce website, the online browsing trail comprising a sequence of one or more actions by the user of the ecommerce website during the online browsing session. The method can additionally include predicting, in real-time, a first user segment for the user from the plurality of user segments during the online browsing session based on the sequence of the one or more actions of the user in the online browsing trail during the online browsing session as recorded by the one or more non-transitory storage modules.

A number of embodiments can include a system. The system can include one or more processing modules and one or more non-transitory storage modules storing computing instructions configured to run on the one or more processing modules. The computing instructions can be configured to run on the one or more processing modules and perform acts of: storing a plurality of user segments for users of an ecommerce website; recording an online browsing trail of a user during an online browsing session on the ecommerce website, the online browsing trail comprising a sequence of one or more actions by the user of the ecommerce website during the online browsing session; and predicting, in real-time, two or more user segments for the user from the plurality of user segments during the online browsing session based on the sequence of the one or more actions of the user in the online browsing trail during the online browsing session as recorded by the one or more non-transitory storage modules, the two or more user segments comprising (1) a first user segment comprising a demographic of the user, and (2) a second user segment comprising a purpose of the online browsing session of the user.

Figure 2:
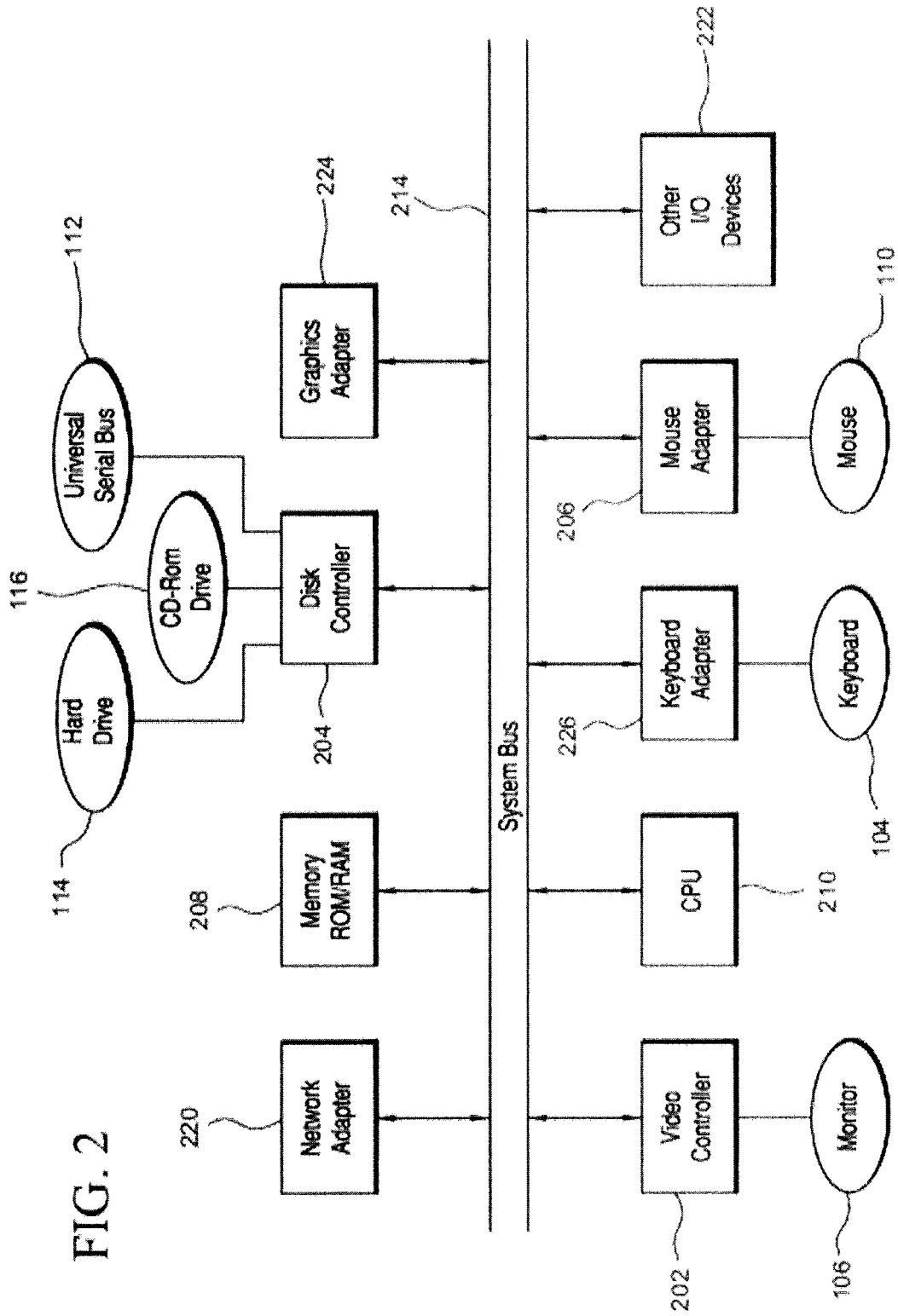
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
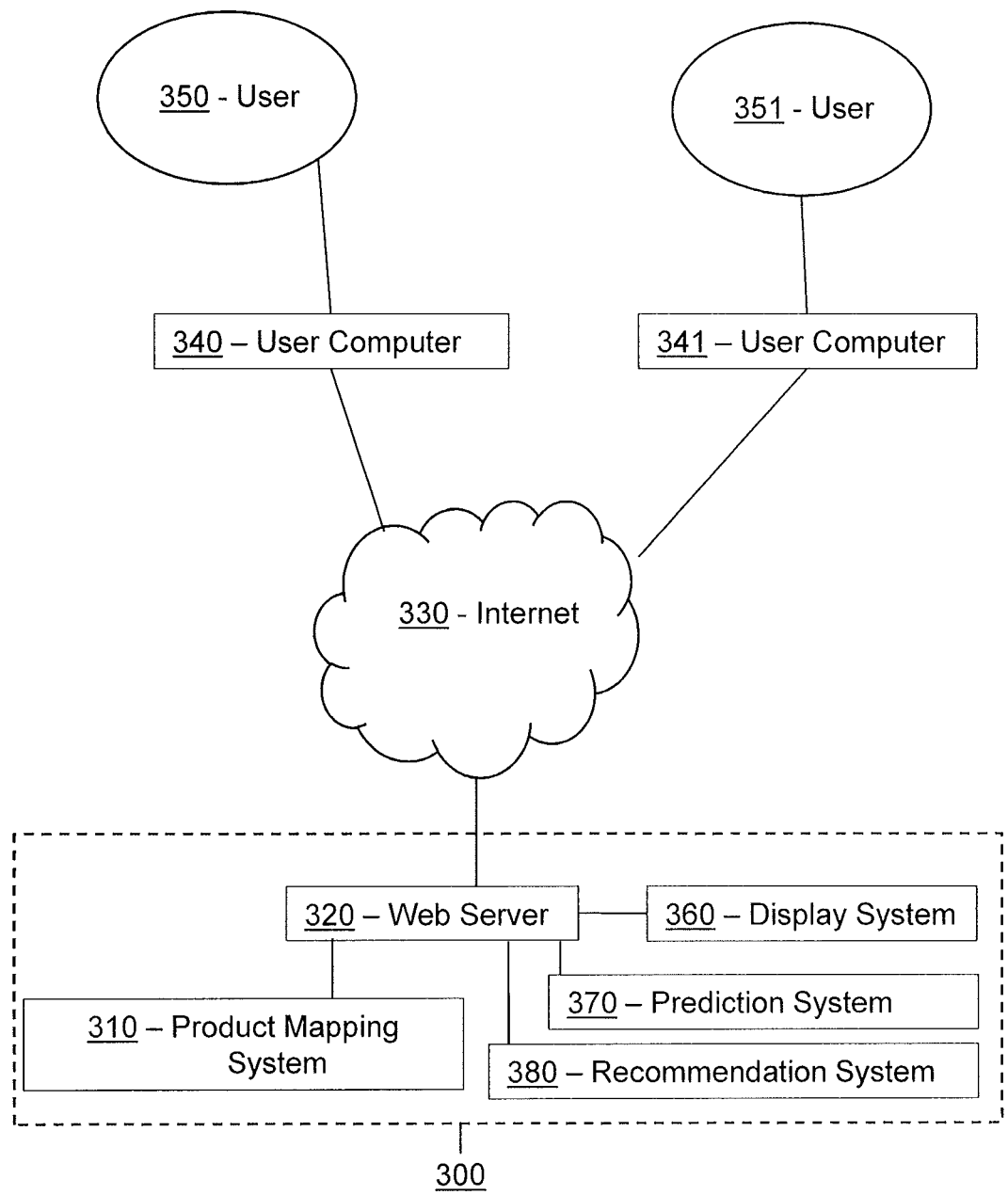
FIG. 3 illustrates a representative block diagram of a system, according to an embodiment.

Turning ahead in the drawings, FIG. 3 illustrates a block diagram of a system 300 that can be employed for real-time user segment prediction. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a product mapping system 310, a web server 320, a display system 360, a prediction system 370, and/or a recommendation system 380. Product mapping system 310, web server 320, display system 360, and prediction system 370, and recommendation system 380 can each be a computer system, such as computer system 100 (FIG. 1), as described above, and can each be a single computer, a single server, or a cluster or collection of computers or servers, or a cloud of computers or servers. In another embodiment, a single computer system can host each of product mapping system 310, web server 320, display system 360, and prediction system 370, and recommendation system 380. Additional details regarding product mapping system 310, web server 320, display system 360, and prediction system 370, and recommendation system 380 are described herein.

In many embodiments, system 300 also can comprise user computers 340, 341. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, product mapping system 310, web server 320, display system 360, and prediction system 370, and recommendation system 380 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of product mapping system 310, web server 320, display system 360, and prediction system 370, and recommendation system 380 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of product mapping system 310, web server 320, display system 360, and prediction system 370, and recommendation system 380. In a similar manner, the processing module(s) and the memory storage module(s) can be local and/or remote to each other.

In many embodiments, product mapping system 310, web server 320, display system 360, and prediction system 370, and recommendation system 380 can be configured to communicate with one or more customer computers 340 and 341. In some embodiments, customer computers 340 and 341 also can be referred to as user computers. In some embodiments, product mapping system 310, web server 320, display system 360, and prediction system 370, and recommendation system 380 can communicate or interface (e.g. interact) with one or more customer computers (such as customer computers 340 and 341) through a network or internet 330. Internet 330 can be an intranet that is not open to the public. Accordingly, in many embodiments, product mapping system 310, web server 320, display system 360, and prediction system 370, and recommendation system 380 (and/or the software used by such systems) can refer to a back end of system 300 operated by an operator and/or administrator of system 300, and customer computers 340 and 341 (and/or the software used by such systems) can refer to a front end of system 300 used by one or more customers 350 and 351, respectively. In some embodiments, customers 350 and 351 also can be referred to as users. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, product mapping system 310, web server 320, display system 360, and prediction system 370, and recommendation system 380 also can be configured to communicate with one or more databases. The one or more databases can comprise a product database that contains information about products, items, or SKUs sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between product mapping system 310, web server 320, display system 360, and prediction system 370, and recommendation system 380, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

Figure 4:
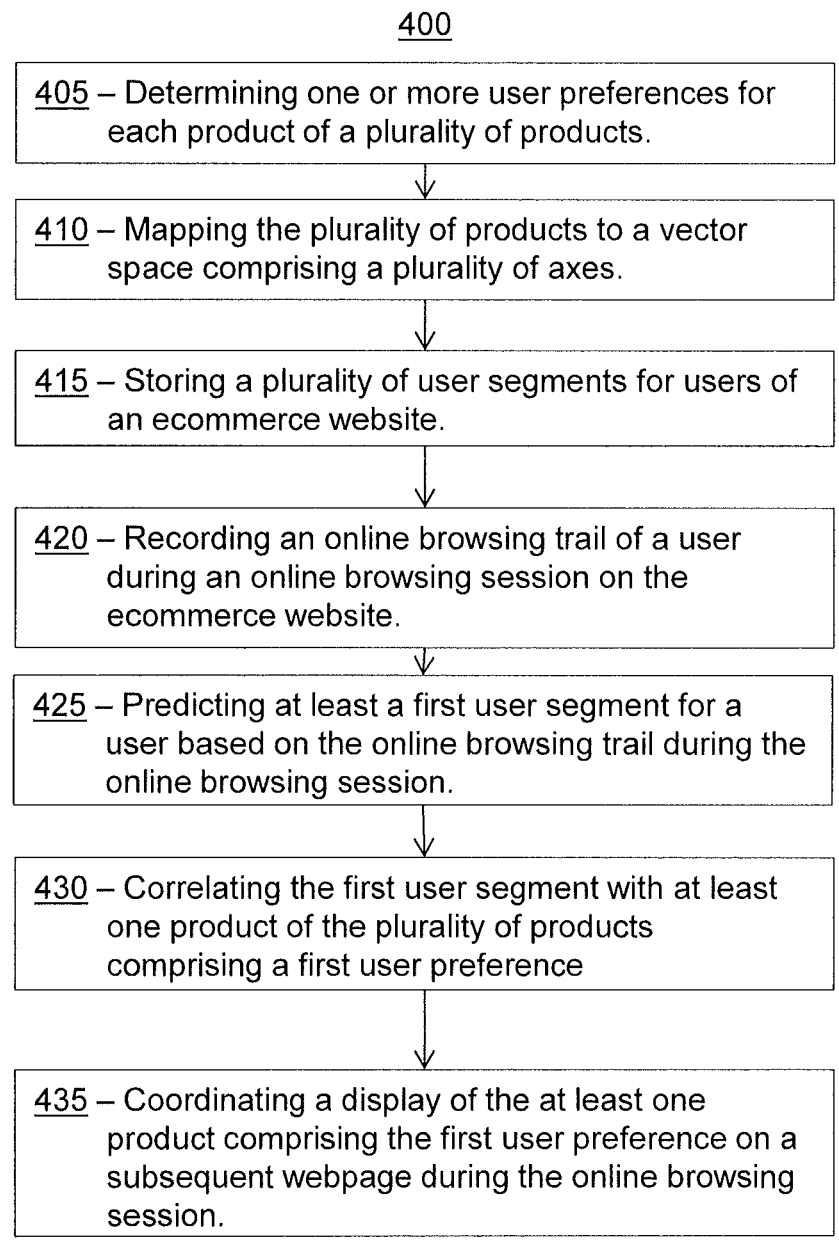
FIG. 4 is a flowchart for a method, according to an embodiment.
Figure 5:
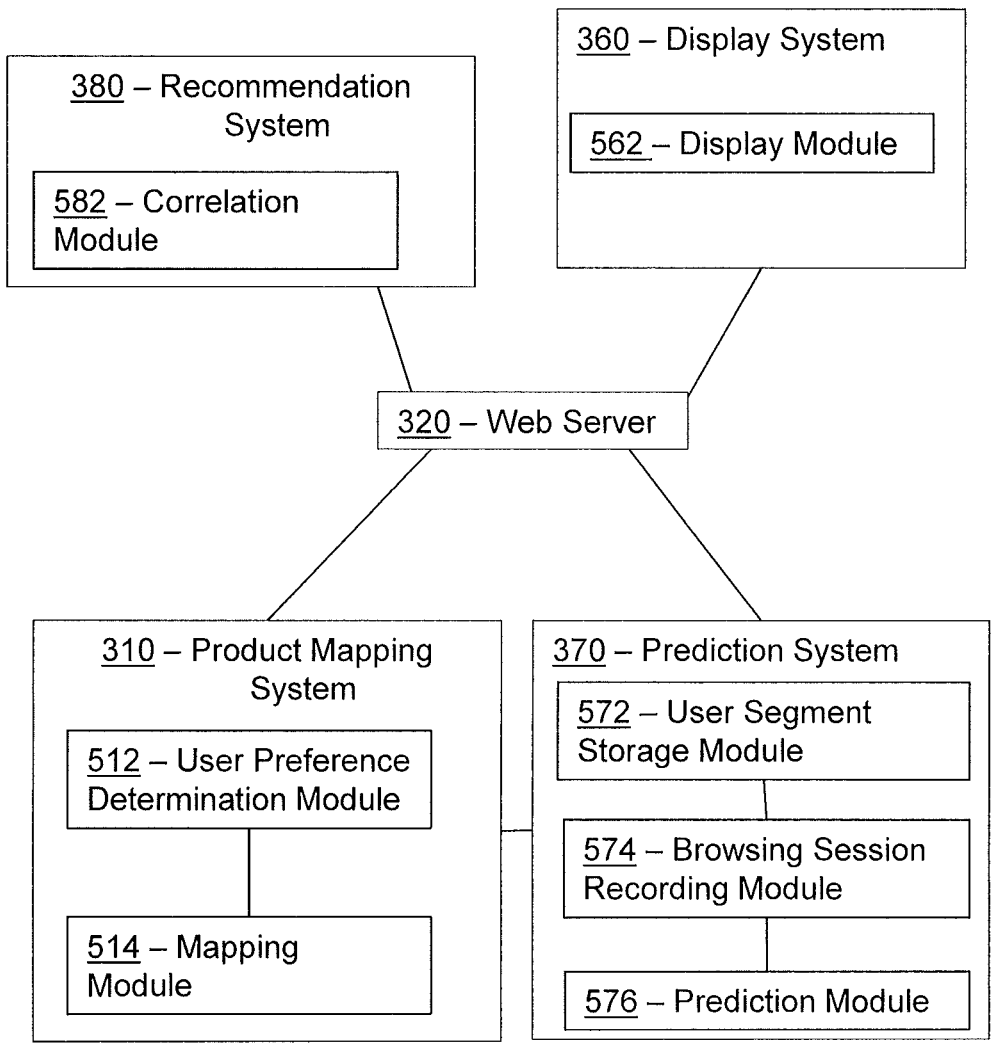
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 514, 562, 572, 574, 576, and/or 582 (FIG. 5). Such non-transitory memory storage modules can be part of a computer system such as product mapping system 310 (FIGS. 3 & 5), display system 360 (FIGS. 3 & 5), prediction system 370 (FIGS. 3 & 5), and/or recommendation system 380 (FIGS. 3 & 5). The processing module(s) can be similar or identical to the processing module(s) described above with respect to computer system 100 (FIG. 1).

Various embodiments are directed to one or more specific improvements to the way computers operate. For example, predicting user segments in real-time uses memory of system 300 (FIG. 3) more efficiently. Moreover, systems and methods disclosed herein reduce latency of the computer system and reduce reaction time from weeks to minutes or even seconds. Furthermore, various embodiments are necessarily rooted in computer technology in order to overcome one or more problems specifically arising in the realm of computer networks, the internet, an intranet, etc. For example, a problem encountered with ecommerce websites on computer networks is the inability for the computer system to predict user segments in real-time based only on the current browsing session.

Method 400 can comprise an activity 405 of determining one or more user preferences for each product of a plurality of products. The one or more products can comprise any product sold on an ecommerce website. The one or more user preferences can comprise any feature(s) or design(s) of the product preferred by one or more user segments, materials of the products, any combinations of multiple products preferred by one or more user segments, products similar to other products, and the like. For example, a user preference for dining plates can comprise certain colors, certain patterns, or a lack of color and patterns. By way of another example, a user may prefer a "bundle" of a plurality of products rather than a single product. In some embodiments, determining one or more user preferences for each product of a plurality of products can comprise determining one or more user preferences for each product of a plurality of products using training sets of webpages present a plurality of products. Training sets of webpages can be configured to collect and label user data of known users into segments and models.

Method 400 can further comprise an activity 410 of mapping the plurality of products to a vector space comprising a plurality of axes. More particularly, mapping the plurality of products to the vector space comprising a plurality of axes can comprise mapping the plurality of products to the vector space such that two or more products of the plurality of products determined to be more similar to one another are closer together on the vector space than two or more other products of the plurality of products that are determined to be less similar to one another. In some embodiments, the vector space can comprise a plurality of axes such that the vector space is n-dimensional. Such a configuration of the vector space allows a user to determine relative proximity of products across numerous dimensions, rather than just horizontal and/or vertical dimensions. Training sets of webpages can be configured to collect and label user data of known users into segments and models. Some embodiments can use an algorithm to map the plurality of vector products to the vector space. More particularly, mapping of the plurality of vector products to the vector space can utilize one or more of local linear embedding or word2vec. In some embodiments, a variant of word2vec where the embedding is constrained to forward looking tokens can but utilized. Tokens that appear proximate one another a predetermined number or percentage of times in the training set are constrained to appear proximate one another as vector products in the vector space. A time-ordered sequence of items, pages, or products visited by users in a session can be used as training data.

Method 400 can further comprise an activity 415 of storing a plurality of possible user segments for users of an ecommerce website. A user segment can comprise one or more of the following: a gender of the user, a gender of a person for whom the user is shopping on the ecommerce web site, an approximate age of the user, an approximate age of the person for whom the user is shopping on the ecommerce website, shipping or pickup preferences of the user, users likely to buy from the ecommerce website during the online browsing session, users that are prime candidates for advertisement campaigns, users likely to only browse the ecommerce website but not buy any products during the online browsing session, and a geographic location of the user. In one or more embodiments, some of the user segments can comprise a demographic of the user, such as age and/or gender of the user, and some of the user segments can comprise a purpose of the browsing session of the user. The purpose of the browsing session can comprise browsing for a different person of a particular age, browsing for the different person of a particular gender, browsing for home delivery of a product, browsing for store-pickup of the product, browsing to buy the product from the ecommerce website during the browsing session, browsing for a particular one-time or irregular event such as a trip, a party, a holiday, and the like.

Method 400 can further comprise an activity 420 of recording an online browsing trail of a user during an online browsing session on the ecommerce website. More particularly, the online browsing trail can comprise a sequence of one or more actions by the user of the ecommerce website during the online browsing session. The sequence of the one or more actions by the user of the ecommerce web site can comprise the order of webpages visited and products selected on the webpages of the ecommerce web site during the online browsing session. The actions by the user can comprise selections by the user on the webpages of the ecommerce web site or queries entered on the ecommerce web site.

Method 400 can further comprise an activity 425 of predicting a first user segment for a user based on the online browsing trail during the online session. More particularly, method 400 can comprise an activity of predicting, in real-time, a first user segment for the user from the plurality of user segments during the online browsing session based on the sequence of the one or more actions of the user in the online browsing trail during the online browsing session as recorded by the one or more non-transitory storage modules. In some embodiments, predicting the first user segment for the user during the online browsing session comprises predicting, in real-time, a probability that the online browsing trail pertains to each user segment of the plurality of user segments. That is, for each specific user segment, a different probability can be calculated that the online browsing trail pertains to that specific user segment of the plurality of user segments. In some embodiments, predicting, in real-time, the first user segment for the user comprises predicting, in real-time, the first user segment for the user during the online browsing session based on a proximity of webpages of the ecommerce web site on the online browsing trail during the sequence of the one or more actions by the user of the ecommerce website during the online browsing session. For example, two webpages visited consecutively can have a different effect on the predicted user segment than two webpages visited with ten different intervening webpages. In a more particular example, a user may visit a webpage for a relatively gender neutral product, such as paper towels. The systems and methods disclosed herein are configured to consider the presence of certain webpages in the proximity of other webpages to make a prediction and inference.

Predicting a first user segment for a user based on the online browsing trail during the online session can comprise predicting a behavior pattern of a user during a browsing session and/or predicting a way that a user will browse during a browsing session. Predicting user segments as described herein is advantageous to conventional methods and systems because subsequent webpages can be tailored to the predicted user segment. In some embodiments, predicting, in real-time, the first user segment for the user from the plurality of user segments during the online browsing session based on the sequence of the one or more actions of the user in the online browsing trail during the online browsing session can comprise predicting, in real-time, the first user segment for the user from the plurality of user segments and at least a second user segment of the plurality of user segments during the online browsing session based on the sequence of the one or more actions of the user in the online browsing trail during the online browsing session. In such embodiments, the first user segment can comprise a demographic of the user, such as but not limited to an age or a gender of the user, and the second user segment can comprise a purpose of the browsing session of the user. The purpose of the browsing session can comprise one or more of browsing for a different person of a particular age, browsing for a different person of a particular gender, browsing for home delivery of a product, browsing for store-pickup of the product, and browsing to buy the product from the ecommerce website during the browsing session. Thus, various embodiments can predict two or more user segments for the user during the online browsing session.

By way of a non-limiting example, assume a user visits a webpage focused on men's shaving cream during a browsing session. Conventional systems may conclude that the user is a male looking for shaving cream. Predicting a first user segment for a user based on the online browsing trail during the online session as disclosed herein, however, can predict that the user is a female browsing the webpage as part of a larger browsing trail—indicating that the user is a candidate for another advertisement campaign such as a Father's Day advertisement campaign. Based on this prediction, system 300 can tailor subsequent webpages to the predicted user segments: that the user is a female, and that the purpose of this browsing session is to browse for a product for a male.

One or more formulas or algorithms can be used to predict, in real-time, a probability that the online browsing trail pertains to each user segment of the plurality of user segments. In one, non-limiting embodiment, predicting the probability that the online browsing trail pertains to each user segment of the plurality of user segments comprises predicting, in real-time, the probability (P) that the online browsing trail pertains to each user segment of the plurality user segments using a formula:

$$\log P(\text{segment} = k \mid \Theta, \text{browseTrail}) = \sum_{t}^{z} \log P(i_t, i_{t+1} \mid \Theta_k)$$

where k is a segment of the plurality of segments, $\Theta$ is the learned model containing the parameters learned from data and used to calculate the probabilities, t is the browse trail, $i_t$ is a product of a previous webpage in the browse trail on the ecommerce website, $i_{t+1}$ is a product of a current webpage in the browse trail of the ecommerce website, and z is the number of pairs of $i_t$ and $i_{t+1}$ being evaluated. It is noted that the score is normalized by the length of the browsing session. As the length of the browsing session increases, the confidence in the predicted user segment also increases. Furthermore, the formula is configured to include the probability that the browse trail pertains to a plurality of segments. In some embodiments, the first user segment for the user comprises a highest probability that the online browsing trail pertains to the first user segment relative to probabilities of other user segments of the plurality of user segments. Similarly, the second user segment can comprise a highest probability that the online browsing trail pertains to the second user segment relative to other user segments of the plurality of user segments. Accordingly, in some embodiments, system 300 (FIG. 3) can be configured to use this formula to predict a first user segment pertaining to a demographic, such as age or gender of the user, and a second user segment pertaining to a purpose of the browsing session of the user. For example, the first user segment can comprise a highest probability that the online browsing trail pertains to the first user segment relative to other user segments of the plurality of user segments pertaining to demographics of the user, and the second user segment comprises a highest probability that the online browsing trail pertains to the second user segment relative to other user segments of the plurality of user segments pertaining to the purpose of the browsing session.

In some embodiments, likelihood function $P(i_t, i_{t+1} \mid \Theta_k)$ can be substantially proportional to a distance of the vectors $i_t$ and $i_{t+1}$ in question. That is, the larger the distance, the smaller the probability of the vectors being similar. In some embodiments, a cosine angle between the vectors that are compared can be used. In such embodiments, the larger the angle, the smaller the similarity. Function utilizing a weighted combination of the angle and magnitude of the vectors can also be used.

Furthermore, in some embodiments, a likelihood function can consider the similarity of a vector to that vector's immediate preceding neighbor, expressed as ($i_t$ and $i_{t-1}$). In some embodiments, a window of items or products visited in the vicinity of the currently viewed item or product can be utilized. For example, a weighted average distance of the current item to the last three items visited in the session can be utilized. If $i_t$ is the current item, a window of three items preceding $i_t$ can be considered as $i_{t-1}$, $i_{t-2}$, and $i_{t-3}$. An average of these preceding items can then be obtained and utilized. Utilizing a window of items is advantageous because the effect of noise can be reduced. For example, a user may have clicked on an advertisement that pertained to a completely orthogonal segment that should be discounted. Utilizing a window of items can also be used as an effective way to promote a high degree of precision.

Returning to FIG. 4, method 400 can further comprise an activity 430 of correlating the first user segment with at least one product of the plurality of products comprising a first user preference. More particularly, the at least one product can comprise a first user preference of a plurality of user preferences associated with the first user segment. For example, based on the sequence of the one or more actions of the user in the online browsing trail during the online browsing session, system 300 (FIG. 3) can predict that the user is a woman. Because women viewing dining plates tend to pay attention to detail about colors and patterns, if the user selects dining plates during the online browsing session, the system 300 (FIG. 3) can correlate the predicted user segment of a woman to one or more dining plate products featuring a variety of colors and patterns. Conversely, based on the sequence of the one or more actions of the user in the online browsing trail during the online browsing session, system 300 (FIG. 3) can predict that the user is a man. Because men viewing dining plates tend to cut subcategories horizontally, if the user selects dining plates during the online browsing session, the system 300 (FIG. 3) can correlate the predicted user segment of a man to one or more dining plate products featuring more generic, more plain, or less colorful dining plates. By way of another example, female shoppers were found to have a stronger preference to bundles of products than male shoppers. Thus, if the system 300 (FIG. 3) predicts that the user is a woman based on the sequence of the one or more actions of the user in the online browsing trail during the online browsing session, then the system can correlate the predicted user segment of a woman to one or more bundles of products. Conversely, if the system 300 (FIG. 3) predicts that the user is a man based on the sequence of the one or more actions of the user in the online browsing trail during the online browsing session, then the system can correlate the predicted user segment of a man to one or more individual products rather than bundles of products.

Returning to FIG. 4, method 400 can further comprise an activity 435 coordinating a display of the at least one product comprising the first user preference on a subsequent webpage displayed to the user during the online browsing session. As noted above, in some embodiments, the first user segment for the user comprises a highest probability that the online browsing trail pertains to the first user segment relative to probabilities of other user segments of the plurality of user segments. Thus, coordinating a display of the at least one product comprising the first user preference on a subsequent webpage during the online browsing session can comprise coordinating a display of the at least one product comprising the first user preference pertaining to the user segment comprising the highest probability that the online browsing history pertains to the first user segment on a subsequent webpage during the online browsing session. In some embodiments, activity 435 can comprise an activity of coordinating a display of (1) a first product comprising a first user preference associated with a first user segment, and (2) at least a second product comprising a second user preference associated with a second user segment. In such embodiments, the first user segment can comprise the highest probability that the online browsing history pertains to the first user segment, and the second user segment can comprise the highest probability that the online browsing history pertains to the second user segment.

FIG. 5 illustrates a block diagram of a portion of system 300 comprising product mapping system 310, web server 320, display system 360, prediction system 370, and recommendation system 380 according to the embodiment shown in FIG. 3. Each of product mapping system 310, web server 320, display system 360, prediction system 370, and recommendation system 380 is merely exemplary and not limited to the embodiments presented herein. Each of product mapping system 310, web server 320, display system 360, prediction system 370, and recommendation system 380 can be employed in many different embodiments or examples not specifically depicted or described herein. In some embodiments, certain elements or modules of product mapping system 310, web server 320, display system 360, prediction system 370, and recommendation system 380 can perform various procedures, processes, and/or acts. In other embodiments, the procedures, processes, and/or acts can be performed by other suitable elements or modules.

In many embodiments, product mapping system 310 can comprise non-transitory memory storage modules 512 and 514, display system 360 can comprise a non-transitory memory storage module 562, prediction system 370 can comprise non-transitory memory storage modules 572, 574, and 576, and recommendation system 380 can comprise non-transitory memory storage module 582. Memory storage module 512 can be referred to as user preference determination module 512, and memory storage module 514 can be referred to as mapping module 514. Memory storage module 562 can be referred to as display module 562. Memory storage module 572 can be referred to as user segment storage module 572, memory storage module 574 can be referred to as browsing session recording module 574, and memory storage module 576 can be referred to as prediction module 576. Memory storage 582 can be referred to as correlation module 582.

In many embodiments, user preference determination module 512 can store computing instructions configured to run on one or more processing modules and perform one or more acts of method 400 (FIG. 4) (e.g., activity 405 of determining one or more user preferences for each product of a plurality of products (FIG. 4)). In some embodiments, mapping module 514 can store computing instructions configured to run on one or more processing modules and perform one or more acts of method 400 (FIG. 4) (e.g., activity 410 of mapping the plurality of products to a vector space comprising a plurality of axes (FIG. 4)). In many embodiments, user segment storage module 572 can store computing instructions configured to run on one or more processing modules and perform one or more acts of method 400 (FIG. 4) (e.g., activity 415 of storing a plurality of user segments for users of an ecommerce website (FIG. 4)). In some embodiments, browsing session recording module 574 can store computing instructions configured to run on one or more processing modules and perform one or more acts of method 400 (FIG. 4) (e.g., activity 420 of recording an online browsing trail of a user during an online browsing session on the ecommerce website (FIG. 4)). In some embodiments, prediction module 576 can store computing instructions configured to run on one or more processing modules and perform one or more acts of method 400 (FIG. 4) (e.g., activity 425 of predicting a first user segment for a user based on the online browsing trail during the online browsing session (FIG. 4)). In some embodiments, correlation module 582 can store computing instructions configured to run on one or more processing modules and perform one or more acts of method 400 (FIG. 4) (e.g., activity 430 of correlating the first user segment with at least one product of the plurality of products comprising a first user preference (FIG. 4)). In some embodiments, display module 562 can store computing instructions configured to run on one or more processing modules and perform one or more acts of methods 400 (FIG. 4) (e.g., activity 435 of coordinating a display of the at least one product comprising the first user preference on a subsequent webpage during the online browsing session (FIG. 4)).

Although predicting user segments in real-time using browse trails has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory storage devices storing computing instructions configured to run on the one or more processors and perform acts of:
 storing a plurality of user segments for users of an ecommerce website;
 recording an online browsing trail of a user during an online browsing session on the ecommerce website, the online browsing trail comprising a sequence of one or more actions by the user of the ecommerce website during the online browsing session;
 predicting, in real-time, a first user segment for the user from the plurality of user segments during the online browsing session based on the sequence of the one or more actions of the user in the online browsing trail during the online browsing session, as recorded by the one or more non-transitory storage devices;
 correlating the first user segment for the user, as predicted, with at least one product of a plurality of products, the at least one product of the plurality of products comprising a first user preference of a plurality of user preferences associated with the first user segment, as predicted;
 determining, for each respective product of the plurality of products, one or more respective user preferences of the plurality of user preferences;
 mapping each respective product of the plurality of products to a vector space comprising a plurality of axes, wherein:
  two or more products of the plurality of products determined to be more similar to one another are closer together on the vector space than two or more products of the plurality of products determined to be less similar to one another; and
 coordinating a display of at least two products of the plurality of products on a subsequent webpage of the ecommerce website during the online browsing session, wherein:
  a first product of the at least two products is associated with the first user preference associated with the first user segment, as predicted; and
  a second product of the at least two products is proximate to the first product of the at least two products on the vector space.

2. The system of claim 1, wherein:
predicting, in real-time, the first user segment for the user during the online browsing session comprises:
 predicting, in real-time, a respective probability that the online browsing trail pertains to each respective user segment of the plurality of user segments; and
the first user segment for the user comprises:
 a highest probability that the online browsing trail pertains to the first user segment of the plurality of user segments, the highest probability being relative to respective probabilities of other user segments of the plurality of user segments.

3. The system of claim 2, wherein predicting, in real-time, the respective probability that the online browsing trail pertains to each respective user segment of the plurality of user segments comprises:
predicting, in real-time, a probability (P) using a formula comprising:

$$\log P(\text{segment} = k \mid \Theta, \textit{browseTrail}) = \sum_{t}^{z} \log P(i_t, i_{t+1} \mid \Theta_k),$$

where:
the probability (P) is the respective probability that the online browsing trail pertains to each respective user segment of the plurality of user segments;
k is a segment of the plurality of user segments;
$\Theta$ is a learned model;
t is the online browsing trail;
$i_t$ is a product of a previous webpage in the online browsing trail on the ecommerce website;
$i_{t+1}$ is a product of a current webpage in the online browsing trail of the ecommerce website; and
z is a number of pairs of $i_t$ and $i_{t+1}$ being evaluated.

4. The system of claim 2, wherein:
the respective probability is normalized by a duration of the online browsing session.

5. The system of claim 1, wherein:
predicting, in real-time, the first user segment for the user comprises:
 predicting, in real-time, the first user segment for the user during the online browsing session based on a proximity of webpages of the ecommerce website on the online browsing trail during the sequence of the one or more actions by the user of the ecommerce website during the online browsing session.

6. The system of claim 1, wherein:
predicting, in real-time, the first user segment for the user from the plurality of user segments during the online browsing session based on the sequence of the one or more actions of the user in the online browsing trail during the online browsing session comprises:
 predicting, in real-time, the first user segment for the user from the plurality of user segments and at least a second user segment of the plurality of user segments during the online browsing session based on the sequence of the one or more actions of the user in the online browsing trail during the online browsing session;
the first user segment comprises a demographic of the user, the demographic of the user comprising one or more of an age of the user or a gender of the user; and
the second user segment comprises a purpose of the online browsing session of the user, the purpose of the online browsing session comprising one or more of:
 browsing for a different person of a particular age;
 browsing for the different person of a particular gender;
 browsing for home delivery of a product;
 browsing for store-pickup of the product; or
 browsing to buy the product from the ecommerce web site during the online browsing session.

7. The system of claim 1, wherein:
predicting, in real-time, the first user segment for the user during the online browsing session based on the sequence of the one or more actions of the user in the online browsing trail during the online browsing session comprises:
 predicting, in real-time, a respective probability that the online browsing trail pertains to each respective user segment of the plurality of user segments; and
 predicting, in real-time, the first user segment for the user from the plurality of user segments and at least a second user segment of the plurality of user segments during the online browsing session based on the sequence of the one or more actions of the user in the online browsing trail during the online browsing session; and predicting, in real-time, the first user segment for the user during the online browsing session based on a proximity of webpages of the ecommerce website on the online browsing trail during the sequence of the one or more actions by the user of the ecommerce website during the online browsing session;

the first user segment comprises a demographic of the user, the demographic of the user comprising one or more of an age of the user or a gender of the user; and the second user segment comprises a purpose of the online browsing session of the user, the purpose of the online browsing session comprising one or more of:
browsing for a different person of a particular age;
browsing for the different person of a particular gender;
browsing for home delivery of a product;
browsing for store-pickup of the product; or
browsing to buy the product from the ecommerce website during the online browsing session the first user segment for the user comprises:
a highest probability that the online browsing trail pertains to the first user segment of the plurality of user segments, the highest probability being relative to respective probabilities of other user segments of the plurality of user segments; and predicting, in real-time, a probability (P) using a formula comprising:

$$\log P(\text{segment} = k \mid \Theta, browseTrail) = \sum_{t}^{z} \log P(i_t, i_{t+1} \mid \Theta_k),$$

where:
the probability (P) is the respective probability that the online browsing trail pertains to each respective user segment of the plurality of user segments;
k is a segment of the plurality of user segments;
$\Theta$ is a learned model;
t is the online browsing trail;
$i_t$ is a product of a previous webpage in the online browsing trail on the ecommerce website;
$i_{t+1}$ is a product of a current webpage in the online browsing trail of the ecommerce website; and
z is a number of pairs of $i_t$ and $i_{t+1}$ being evaluated.

8. A method, comprising:
storing a plurality of user segments for users of an ecommerce website in one or more non-transitory storage devices;
recording an online browsing trail of a user during an online browsing session on the ecommerce website, the online browsing trail comprising a sequence of one or more actions by the user of the ecommerce website during the online browsing session;
predicting, in real-time, a first user segment for the user from the plurality of user segments during the online browsing session based on the sequence of the one or more actions of the user in the online browsing trail during the online browsing session, as recorded by the one or more non-transitory storage devices;
correlating the first user segment for the user, as predicted, with at least one product of a plurality of products, the at least one product of the plurality of products comprising a first user preference of a plurality of user preferences associated with the first user segment, as predicted;
determining, for each respective product of the plurality of products, one or more respective user preferences of the plurality of user preferences;
mapping each respective product of the plurality of products to a vector space comprising a plurality of axes, wherein:
two or more products of the plurality of products determined to be more similar to one another are closer together on the vector space than two or more products of the plurality of products determined to be less similar to one another; and
coordinating a display of at least two products of the plurality of products on a subsequent webpage of the ecommerce website during the online browsing session, wherein:
a first product of the at least two products is associated with the first user preference associated with the first user segment, as predicted; and
a second product of the at least two products is proximate to the first product of the at least two products on the vector space.

9. The method of claim 8, wherein:
predicting, in real-time, the first user segment for the user during the online browsing session comprises:
predicting, in real-time, a respective probability that the online browsing trail pertains to each respective user segment of the plurality of user segments; and
the first user segment for the user comprises:
a highest probability that the online browsing trail pertains to the first user segment of the plurality of user segments, the highest probability being relative to respective probabilities of other user segments of the plurality of user segments.

10. The method of claim 9, wherein predicting, in real-time, the respective probability that the online browsing trail pertains to each respective user segment of the plurality of user segments comprises:
predicting, in real-time, a probability (P) using a formula comprising:

$$\log P(\text{segment} = k \mid \Theta, browseTrail) = \sum_{t}^{z} \log P(i_t, i_{t+1} \mid \Theta_k),$$

where:
the probability (P) is the respective probability that the online browsing trail pertains to each respective user segment of the plurality of user segments;
k is a segment of the plurality of user segments;
$\Theta$ is a learned model;
t is the online browsing trail;
$i_t$ is a product of a previous webpage in the online browsing trail on the ecommerce website;
$i_{t+1}$ is a product of a current webpage in the online browsing trail of the ecommerce website; and
z is a number of pairs of $i_t$ and $i_{t+1}$ being evaluated.

11. The method of claim 9, wherein:
the respective probability is normalized by a duration of the online browsing session.

12. The method of claim 8, wherein:
predicting, in real-time, the first user segment for the user comprises:

predicting, in real-time, the first user segment for the user during the online browsing session based on a proximity of webpages of the ecommerce website on the online browsing trail during the sequence of the one or more actions by the user of the ecommerce website during the online browsing session.

13. The method of claim 8, wherein:
predicting, in real-time, the first user segment for the user from the plurality of user segments during the online browsing session based on the sequence of the one or more actions of the user in the online browsing trail during the online browsing session comprises:
  predicting, in real-time, the first user segment for the user from the plurality of user segments and at least a second user segment of the plurality of user segments during the online browsing session based on the sequence of the one or more actions of the user in the online browsing trail during the online browsing session;
the first user segment comprises a demographic of the user, the demographic of the user comprising one or more of an age of the user or a gender of the user; and
the second user segment comprises a purpose of the online browsing session of the user, the purpose of the online browsing session comprising one or more of:
  browsing for a different person of a particular age;
  browsing for the different person of a particular gender;
  browsing for home delivery of a product;
  browsing for store-pickup of the product; or
  browsing to buy the product from the ecommerce web site during the online browsing session.

14. The method of claim 8, wherein:
predicting, in real-time, the first user segment for the user during the online browsing session based on the sequence of the one or more actions of the user in the online browsing trail during the online browsing session comprises:
  predicting, in real-time, a respective probability that the online browsing trail pertains to each respective user segment of the plurality of user segments; and
  predicting, in real-time, the first user segment for the user from the plurality of user segments and at least a second user segment of the plurality of user segments during the online browsing session based on the sequence of the one or more actions of the user in the online browsing trail during the online browsing session; and
  predicting, in real-time, the first user segment for the user during the online browsing session based on a proximity of webpages of the ecommerce website on the online browsing trail during the sequence of the one or more actions by the user of the ecommerce website during the online browsing session;
the first user segment comprises a demographic of the user, the demographic of the user comprising one or more of an age of the user or a gender of the user; and
the second user segment comprises a purpose of the online browsing session of the user, the purpose of the online browsing session comprising one or more of:
  browsing for a different person of a particular age;
  browsing for the different person of a particular gender;
  browsing for home delivery of a product;
  browsing for store-pickup of the product; or
  browsing to buy the product from the ecommerce website during the online browsing session the first user segment for the user comprises:
  a highest probability that the online browsing trail pertains to the first user segment of the plurality of user segments, the highest probability being relative to respective probabilities of other user segments of the plurality of user segments; and
predicting, in real-time, a probability (P) using a formula comprising:

$$\log P(\text{segment} = k \mid \Theta, browseTrail) = \sum_{t}^{z} \log P(i_t, i_{t+1} \mid \Theta_k),$$

where:
the probability (P) is the respective probability that the online browsing trail pertains to each respective user segment of the plurality of user segments;
k is a segment of the plurality of user segments;
$\Theta$ is a learned model;
t is the online browsing trail;
$i_t$ is a product of a previous webpage in the online browsing trail on the ecommerce website;
$i_{t+1}$ is a product of a current webpage in the online browsing trail of the ecommerce website; and
z is a number of pairs of $i_t$ and $i_{t+1}$ being evaluated.

15. A system comprising:
one or more processors; and
one or more non-transitory storage devices storing computing instructions configured to run on the one or more processors and perform acts of:
  storing a plurality of user segments for users of an ecommerce website;
  recording an online browsing trail of a user during an online browsing session on the ecommerce website, the online browsing trail comprising a sequence of one or more actions by the user of the ecommerce website during the online browsing session;
  predicting, in real-time, two or more user segments for the user from the plurality of user segments during the online browsing session based on the sequence of the one or more actions of the user in the online browsing trail during the online browsing session, as recorded by the one or more non-transitory storage devices, the two or more user segments comprising:
    (1) a first user segment of the plurality of user segments comprising a demographic of the user; and
    (2) a second user segment of the plurality of user segments comprising a purpose of the online browsing session of the user;
  correlating either the first user segment of the plurality of user segments, as predicted, or the second user segment of the plurality of user segments, as predicted, with at least one product of a plurality of products, the at least one product of the plurality of products comprising a first user preference of a plurality of user preferences associated with the either the first user segment of the plurality of user segments, as predicted, or the second user segment of the plurality of user segments, as predicted;
  determining, for each respective product of the plurality of products, one or more respective user preferences of the plurality of user preferences;
  mapping each respective product of the plurality of products to a vector space comprising a plurality of axes, wherein:

two or more products of the plurality of products determined to be more similar to one another are closer together on the vector space than two or more products of the plurality of products determined to be less similar to one another; and coordinating a display of at least two products of the plurality of products on a subsequent webpage of the ecommerce website during the online browsing session, wherein:

a first product of the at least two products is associated with either the first user preference associated with either the first user segment of the plurality of user segments, as predicted, or the second user segment of the plurality of user segments, as predicted; and a second product of the at least two products is proximate to the first product of the at least two products on the vector space.

16. The system of claim 15, wherein:

predicting, in real-time, the two or more user segments for the user during the online browsing session comprises:

predicting, in real-time, that the online browsing trail pertains to each respective user segment of the plurality of user segments;

the first user segment comprises:

a first highest probability that the online browsing trail pertains to the first user segment relative to other user segments of the plurality of user segments pertaining to demographics of the user; and the second user segment comprises:

a second highest probability that the online browsing trail pertains to the second user segment relative to other user segments of the plurality of user segments pertaining to the purpose of the online browsing session.

17. The system of claim 16, wherein predicting, in real-time, the first highest probability that the online browsing trail pertains to the first user segment comprises:

predicting, in real-time, a probability (P) using a formula comprising:

$$\log P(\text{segment} = k \mid \Theta, \textit{browseTrail}) = \sum_{t}^{z} \log P(i_t, i_{t+1} \mid \Theta_k),$$

where:

the probability (P) is the first highest probability that the online browsing trail pertains to the first user segment;

k is a segment of the plurality of user segments;

$\Theta$ is a learned model;

t is the online browsing trail;

$i_t$ is a product of a previous webpage in the online browsing trail on the ecommerce website;

$i_{t+1}$ is a product of a current webpage in the online browsing trail of the ecommerce website; and z is a number of pairs of $i_t$ and $i_{t+1}$ being evaluated.

18. The system of claim 16, wherein:

the first highest probability is normalized by a duration of the online browsing session.

19. The system of claim 15, wherein:

the demographic of the user of the first user segment comprises one or more of an age of the user or a gender of the user; and the purpose of the online browsing session of the user of the second user segment comprises one or more of:

browsing for a different person of a particular age;

browsing for the different person of a particular gender;

browsing for home delivery of a product;

browsing for store-pickup of the product; or browsing to buy the product from the ecommerce website during the online browsing session.

20. The system of claim 15, wherein:

predicting, in real-time, the first user segment for the user comprises:

predicting, in real-time, the first user segment for the user during the online browsing session based on a proximity of webpages of the ecommerce website on the online browsing trail during the sequence of the one or more actions by the user of the ecommerce website during the online browsing session.

* * * * *